Figure 1:
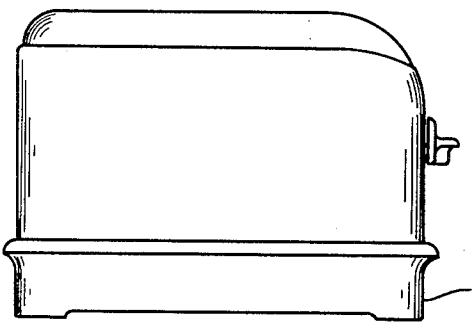

July 10, 1951  B. G. OLVING  2,560,387
AUTOMATIC ELECTRIC TOASTER
Filed Nov. 22, 1944  6 Sheets-Sheet 1

INVENTOR.
BROR G. OLVING
BY

July 10, 1951     B. G. OLVING     2,560,387
AUTOMATIC ELECTRIC TOASTER
Filed Nov. 22, 1944     6 Sheets-Sheet 2

INVENTOR.
BROR G. OLVING
BY

July 10, 1951 B. G. OLVING 2,560,387
AUTOMATIC ELECTRIC TOASTER
Filed Nov. 22, 1944 6 Sheets-Sheet 3

INVENTOR.
BROR G. OLVING
BY H. M. Biebel
Atty

July 10, 1951 B. G. OLVING 2,560,387
AUTOMATIC ELECTRIC TOASTER
Filed Nov. 22, 1944 6 Sheets-Sheet 4

Fig-9

Fig-10

INVENTOR.
BROR G. OLVING
BY
*N. M. Biebel*
Atty

July 10, 1951 B. G. OLVING 2,560,387
AUTOMATIC ELECTRIC TOASTER
Filed Nov. 22, 1944 6 Sheets-Sheet 6

INVENTOR.
BROR G. OLVING

Patented July 10, 1951

2,560,387

UNITED STATES PATENT OFFICE 2,560,387

AUTOMATIC ELECTRIC TOASTER

Bror G. Olving, Elgin, Ill., assignor to McGraw Electric Company, Elgin, Ill., a corporation of Delaware Application November 22, 1944, Serial No. 564,621

18 Claims. (Cl. 219—19)

My invention relates to electric toasters and particularly to electronic timing means for such toasters.

An object of my invention is to provide a timing means and an electric circuit therefor which are dependable and will stand up in service for a long time.

Another object of my invention is to provide a timing means, the performance of which depends upon the inherent electrical characteristics of its component parts, and the operation of which is not dependent upon nor controlled by any energy supplied from mechanical or thermal storage devices.

Another object of my invention is to provide a timing means and an electric circuit therefor, including an electronic tube to obtain the above mentioned performance.

In practicing my invention I provide a timing circuit, comprising an electron tube coupled with a timing condenser, which is charged to a predetermined voltage preparatory to the energization of the toast heating elements and which discharges through a timing resistor in a length of time which will provide the proper or desired degree of toasting.

Figure 2:
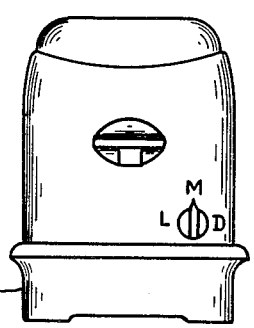
Figure 3:
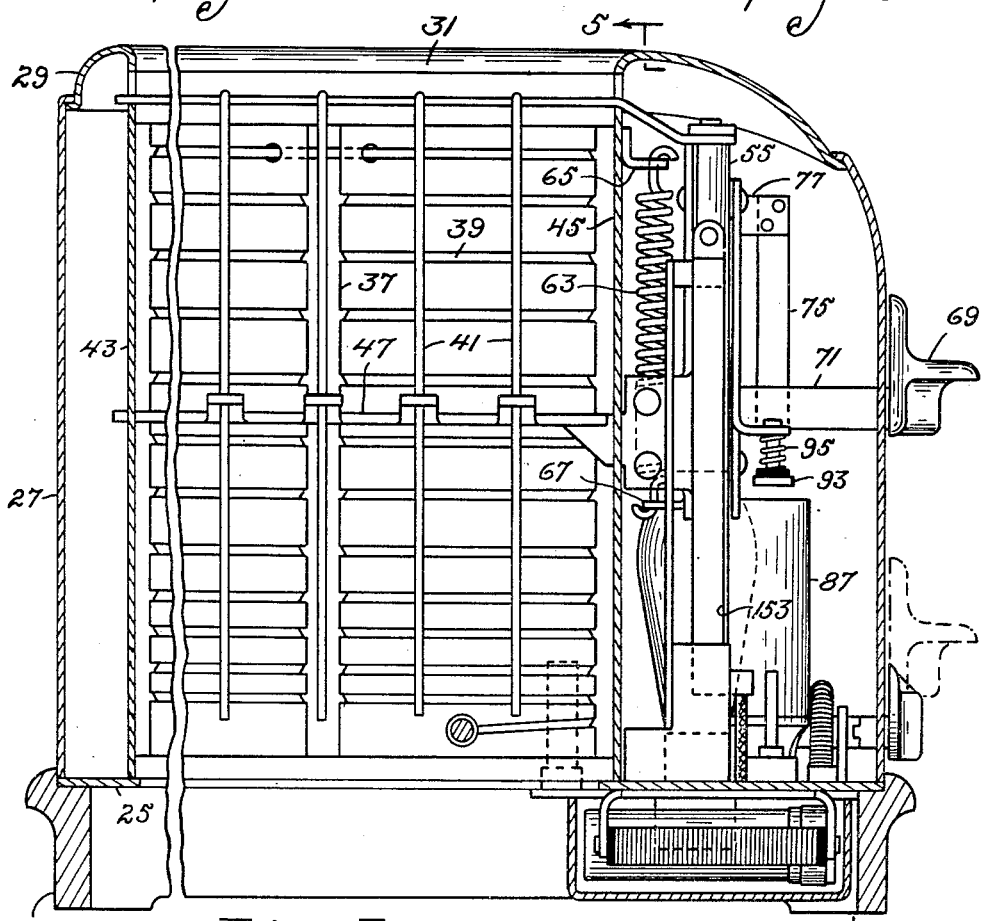
Figure 4:
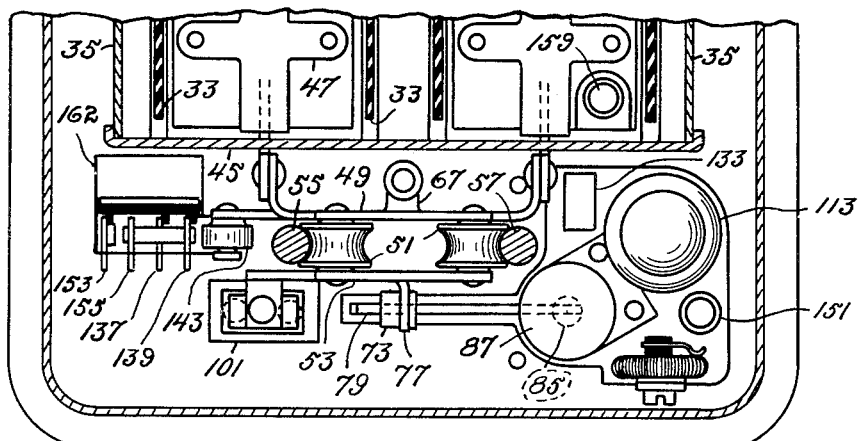
Figure 5:
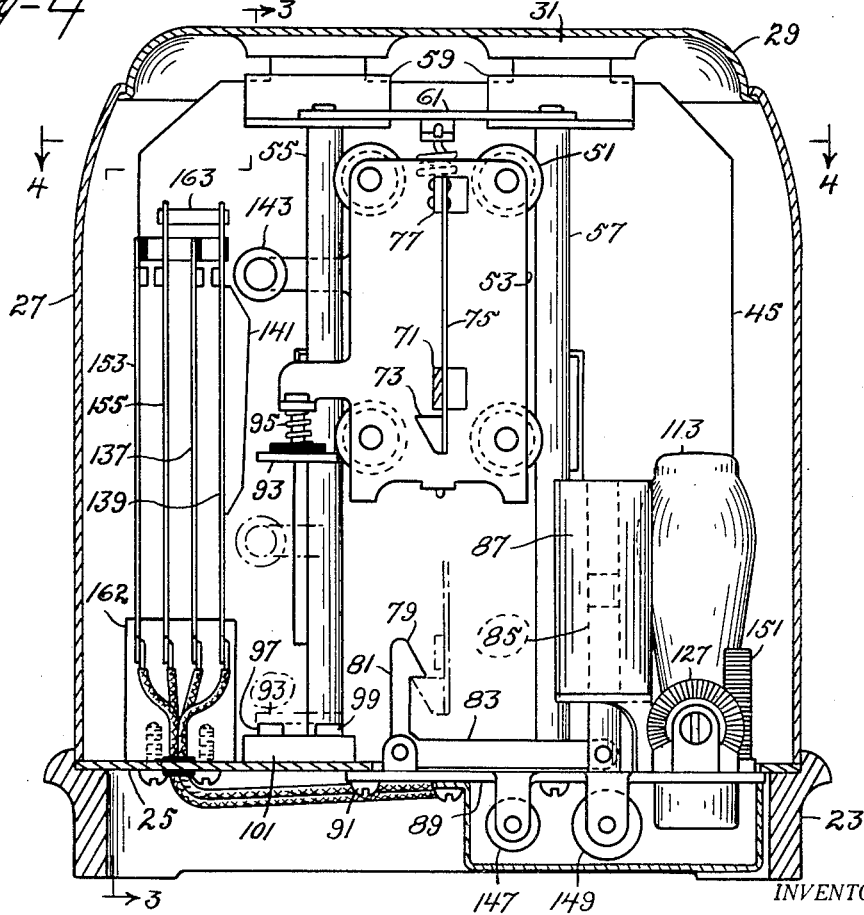
Figure 6:
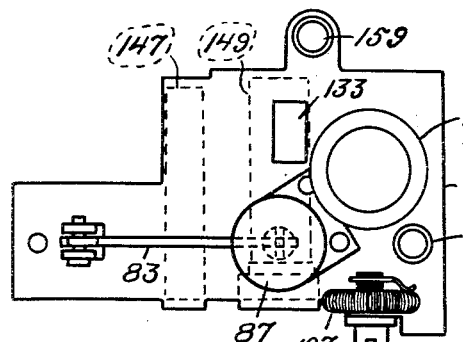
Figure 7:
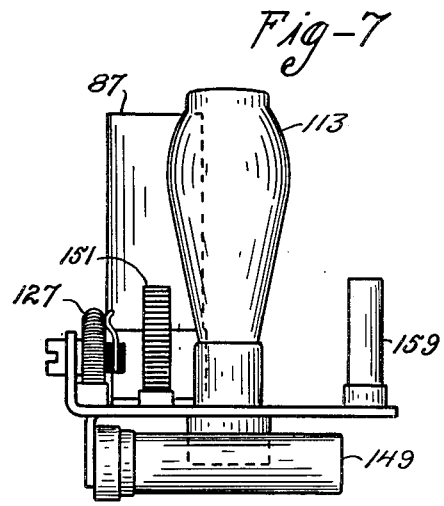
Figure 8:
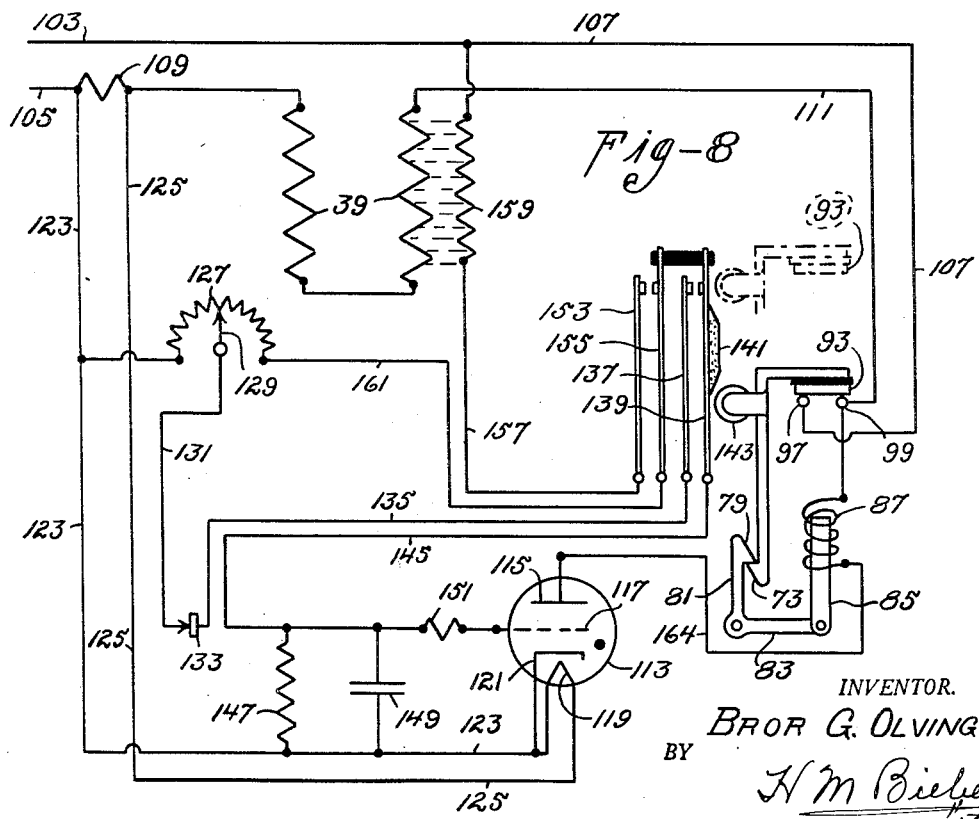
Figure 11:
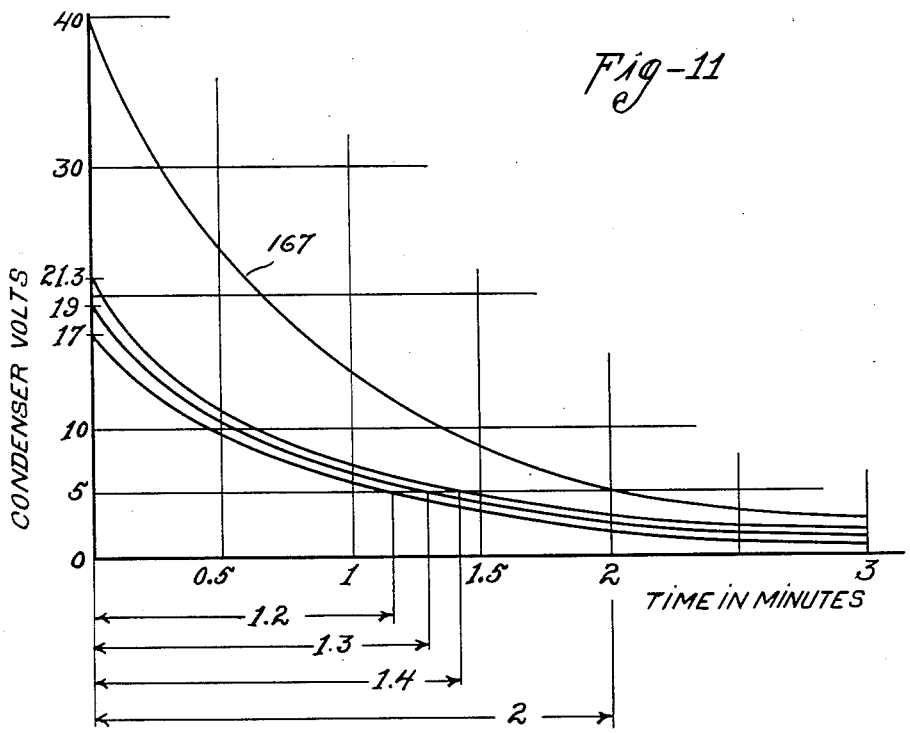
Figure 12:
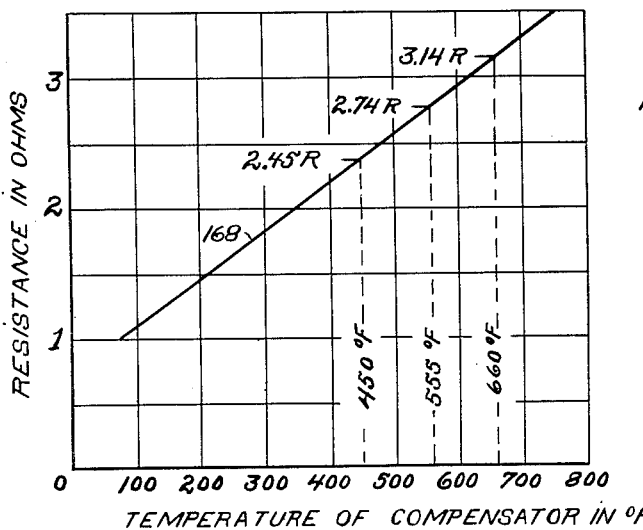
Figure 13:
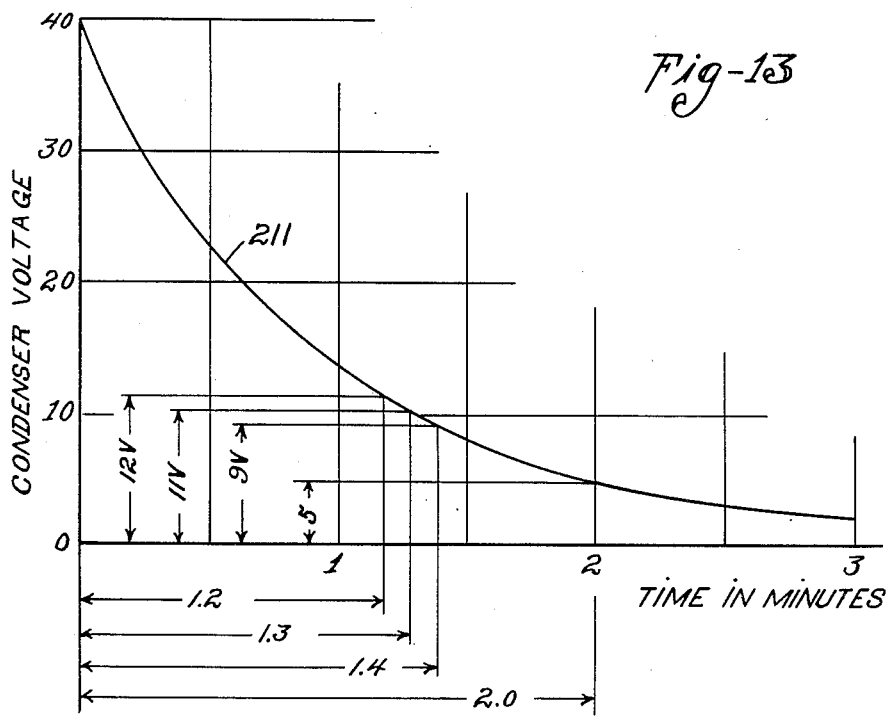
Figure 14:
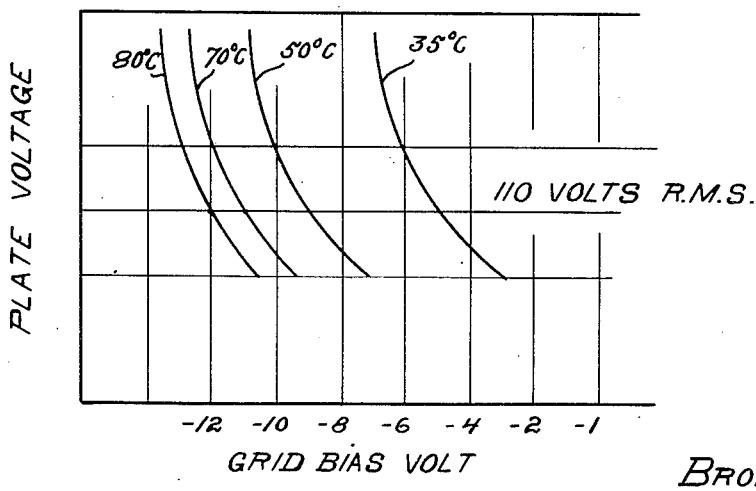

In the drawings,

Figure 1 is a side elevational view of a toaster embodying my invention,

Fig. 2 is a view in front elevation thereof, both Figs. 1 and 2 being shown on a reduced scale, Fig. 3 is a vertical, longitudinal, sectional view taken on the line 3—3 of Fig. 5, Fig. 4 is a fragmentary, horizontal, sectional view taken on the line 4—4 of Fig. 5, Fig. 5 is a vertical, lateral, sectional view taken on the line 5—5 of Fig. 3, Fig. 6 is a top plan view of the assembled timer means, Fig. 7 is a side view of the elements shown in Fig. 6, Fig. 8 is a circuit diagram of one form of timing element applied to a toaster, Figs. 9 and 10 are circuit diagrams showing modifications of Fig. 8, Fig. 11 is a graph showing condenser discharge when used with a compensating resistance exposed to the toast heating chamber, Fig. 12 is a graph showing resistance changes of a compensating resistor when subjected to temperature changes, Fig. 13 is a graph showing condenser discharge characteristics when a mercury vapor electron tube is used and is subjected to heat from the toast heating elements, and, Fig. 14 is a graph showing characteristics of the tube referred to in Fig. 13.

I have shown a standard two-slice toaster in Figs. 1 to 5 inclusive, designated by numeral 21. This toaster comprises a base frame 23, which may be made of molded composition and which supports against its upper surface a base plate 25, as well as an outside casing 27. Since the details of construction of these parts constitute no part of my present invention, it is to be understood that these parts are held in proper operative position by any suitable or desired means. I provide further a top or cover 29, which is provided with a pair of longitudinally-extending openings 31, through which slices of bread may be inserted and through which they may be vertically upwardly removed after toasting.

I provide further a pair of electric toast heating elements 33 for each of the two toasting chambers, each toasting chamber being defined on its outside by a baffle plate 35, which may be made of relatively thin sheet metal, and by the inner toast heating element 33. Each toast heating element includes one or more pieces of electric insulating sheet 37, such as mica, on which is wound a strip 39 of electric resistance material. I provide further a plurality of vertically extending guard or guide wires 41, and all of these parts constitute no part of my invention. A rear intermediate wall 43 is also provided, as well as a front intermediate wall 45, and the mounting of the pieces of mica of the heating elements and the mounting of the front and rear intermediate plates 43 and 45 may be as desired.

I provide a bread carrier 47 in each one of the toasting chambers hereinbefore described, the rear end portions of each bread carrier extending through vertical slots in the rear wall 43, while the front end portion of each bread carrier extends through a vertical slot in the front intermediate wall 45. The front end portions of the bread carriers are secured to a rear carriage plate 49 which supports four grooved rollers 51 mounted on stub shafts extending between the rear carriage plate 49 and a front carriage plate 53. Each pair of rollers 51, comprising one of the upper and one of the lower rollers, is adapted to engage with a vertical standard 55 and 57, which permits of upward and downward movement of the bread carriers and of certain other parts secured thereto. The position of the bread carrier shown in full lines in Figs. 3 and 5 is that of the non-toasting position, from which position the carriers may be moved downwardly by any desired moving means into their lowermost position, which is the socalled toasting position. The lower ends of rods 55 and 57 are held by bottom plate 25, while the upper ends of these two rods are held by top frame plates 59 and by a cross bar 61, all in a manner now well known in the art.

A spring 63 has its upper end secured to a bracket 65, which latter is secured to the front intermediate wall 45 adjacent the upper end thereof, while its lower end is secured to a lug 67, which extends rearwardly from the rear carriage plate 49. The spring 63 is effective to bias the bread carriers into their upper or non-toasting position, from which they may be moved downwardly by pressure by the operator on a knob 69, which is secured to the front protruding end portion of a bar 71, which is either part of or secured to the front carriage plate 53. A hook 73 is secured to the lower end portion of a resilient bar 75, the upper end portion of which is secured to a bracket 77, mounted on the front carriage plate 53.

When an operator moves the bread carriers downwardly, the hook 73 is adapted to engage the hook end portion 79 of a bell crank lever having a vertical arm 81, as well as a horizontal arm 83. The free end of arm 83 is pivotally secured to the armature core 85 of an electromagnetic latch release means, including, in addition to the armature core 85, a coil 87. The bell crank lever, as well as the coil 87, is secured to and mounted on a base plate 89, which is secured against the under surface of base plate 25 as by a plurality of short machine screws 91.

Energization of the toast heating elements, including the resistor strip 39, is effected by a contact bridging member 93, which is insulatedly mounted on front carriage plate 53, a short compression coil spring 95 being provided to ensure proper operative engagement of contact bridging member 93 with a pair of fixed contacts 97 and 99 which are insulatedly supported on base plate 25 by a small block 101 of electric-insulating material, so positioned as to be engageable by the contact bridging member 93 when the same is moved downwardly with the broad carriers.

As has already been hereinbefore set forth, these details of a toaster assembly are already old and well known in the art and have been here described in order to point out the use of my timing means, which will now be described in further detail.

Referring now to Fig. 8 of the drawings, I have there shown a diagram of connections embodying my invention. A pair of supply circuit conductors 103 and 105 are shown, of which conductor 103 is connected by a conductor 107 to fixed contact 97 hereinbefore described. Conductor 105 is connected to one terminal of a small resistor 109, the other terminal of which is connected to one terminal of the heaters of the toast heating elements 33, the other terminal of which is connected by a conductor 111 to the other fixed contact 99.

I provide an electron tube 113, which includes a plate anode 115, a grid 117, a heated filament 119, which is adapted to heat a cathode 121. The filament 119 is connected by two conductors 123 and 125 to the terminals of the small resistor 109 hereinbefore mentioned. The tube 113 will become conducting when the voltage applied thereto, and particularly to the grid and to the hot cathode, reaches a predetermined relatively low negative value.

I provide further a potentiometer 127, which is preferably positioned on plate 89 and which may have a resistance on the order of 20 ohms and which has a zero temperature coefficient of resistance. A movable contact arm 129 is provided for the potentiometer 127 and is adapted to engage any point of the resistance thereof. The fixed terminal of contact arm 129 is connected by a conductor 131 to one terminal of a half-wave dry-type rectifier 133, the other terminal of which is connected by a conductor 135 to the fixed end of a resilient contact arm 137. A second resilient contact arm 139 is mounted in spaced relation relatively to contact arm 137 and has thereon a cam surface 141, which is adapted to be engaged by a roller 143 mounted on rear carriage plate 49. Contact arm 139 is connected by a conductor 145 to one terminal of a timing resistor 147 and to one terminal of a timing condenser 149, as well as to one terminal of a current limiting resistor 151, the other terminal of which is connected to grid 117. The ohmic resistance of timing resistor 147 may be on the order of 10 megohms, while the resistance of resistor 151 may be on the order of 200 ohms and limits the discharge current of condenser 149 when it fires tube 113.

I provide further a second pair of resilient contact arms 153 and 155, of which arm 153 is connected by a conductor 157 to one terminal of a resistor 159, the other terminal of which is connected to conductor 107. The material of resistance 159 has a positive temperature coefficient of resistance, and its ohmic value when cold is on the order of 35 ohms. The contact arm 155 is connected by a conductor 161 to one terminal of the potentiometer 127, the other terminal of which is connected to conductor 123. The capacitance of the timing condenser 149 is on the order of 10 microfarads.

The four contact arms 137, 139, 153, and 155 are held in non-engaging positions by a block of electric-insulating material 162 which is secured to base plate 25 as by machine screws. A connecting block 163, of electric-insulating material, is provided to hold arms 155 and 139 so as to ensure that arms 153 and 155 will engage before arms 137 and 139 and that arms 137 and 139 will disengage before arms 153 and 155.

Let it now be assumed that an operator desires to use the toaster hereinbefore described to toast one or two slices of bread which have been placed in the toaster on the bread carriers, which are in their upper or non-toasting position. He will then press downwardly on knob 69, with the result that coincident with the downward movement of the bread carriers, roller 143 presses against the cam surface 141, causing engagement of the two contact arms 137 and 139, as well as of the two contact arms 153 and 155. Engagement of the two contact arms 153 and 155, during the time that the roller 143 is in engagement with the cam surface 141, causes energization of potentiometer 127 and therefore of the half-wave dry-type rectifier 133, the circuit of which is closed by contact arms 137 and 139. Part of the potentiometer voltage is impressed on the timing circuit, current passing through the half-wave rectifier 133, through the closed switch comprising contact arms 137 and 139, and back to the opposite end of the potentiometer, thus charging condenser 149 to a voltage corresponding to the setting of the potentiometer 127. With the capacitance of the condenser 149 on the order of 10 microfarads and the total resistance of the potentiometer approximately 20 ohms, the condenser will be charged to the desired voltage in $20 \times 10 \times 10{-}6 = .0002$ second. As the movement of knob 69 from the non-toasting to the toasting position requires approximately one-half second, there is ample time to charge the condenser during the downward travel of knob 69.

Although voltage is being impressed on the plate circuit of the tube 113 at the instant the main switch, comprising contacts 97 and 99 and contact bridging member 93, is being closed, the tube is still non-conducting, as a comparatively high negative voltage is being impressed on the grid 117 from the now charged condenser 149. The particular tube illustrated in Fig. 8 of the drawings will fire or become conducting when the negative voltage on the grid decreases to —5 volts.

As soon as the knob 69 has been moved to its lowermost position, in which the carriers are at the lowermost or toasting position, charging of condenser 149 is interrupted, and the condenser 149 begins to discharge through the timing resistor 147, which, as will be noted, is connected in shunt with the condenser 149. The cold resistance of the timing resistor 147 is on the order of 10 megohms, so that it will require approximately two to three minutes to discharge from its initial voltage of 100 volts down to 5 volts. When the condenser has discharged through the timing resistor 147 to about 5 volts and the grid is at a negative potential of —5 volts, the tube fires or becomes conducting, and current passes through the tube through a circuit substantially as follows: from supply circuit conductor 103, conductor 107, through the closed main switch comprising contacts 97 and 99 and contact bridging member 93, through coil 87, through a conductor 164 to plate 115, to cathode 121, and from there through conductor 123 to the other supply circuit conductor 105.

This causes quick upward movement of the core 85 and release of the hook member 73 with quick upward movement of the carriers into their non-toasting position, ready for removal of the slice or slices of toast which have just been toasted.

If it is desired to change the degree of toasting obtained during a toasting operation, contact arm 129 of the potentiometer 127 may be moved from its position. Let it be assumed that "medium" toast is obtained when contact arm 129 is in the position shown in Fig. 8 of the drawings. Then if the arm is moved in a counter-clockwise direction, that is toward the left, as seen in Fig. 8, lighter toast will be obtained. Whereas, if contact arm 129 is turned in a clockwise direction, or toward the right, as seen in Fig. 8 of the drawings, darker toast will be obtained. As has already been hereinbefore stated, the compensating resistor 159 has a high positive temperature coefficient of resistance, and it is subject to heat either from the toasting chamber or from the heated resistors 39. The resistance of resistor 159 will therefore increase with increase of temperature of the toaster structure, and particularly of the toasting chamber, so that the resistance of, and the voltage drop across the compensating resistor will increase, thereby decreasing the voltage across the potentiometer and consequently decreasing the voltage to which the timing condenser 149 is charged during the downward movement of the bread carriers.

Referring now to Fig. 11 of the drawings, I have there shown curves of the rate of decay of the voltage of the condenser 149 when the same is discharging. If the setting of contact arm 129 of the potentiometer is such that the condenser is charged to 40 volts, then curve 167 shows the rate of decrease or decay of the voltage; and it will be noted that the voltage decreases to substantially 5 volts in two minutes. If, now, a second operation of the toaster is effected immediately following the first operation, the temperature of compensating resistance 159 will have been increased to 2.45 of its initial cold resistance, as shown by 169 in Fig. 12; and in the second following operation, its temperature will have increased to such a value as to cause its resistance to increase to 2.74 times its cold value; whereas a third successive operation will cause its temperature to increase to a value to cause its resistance to be substantially 3.14 times its cold resistance. Applying these values of the increase in resistance of compensating resistor 159, we find that the potential to which the timing condenser 149 is charged at the beginning of the second operation is 21.3 volts, that to which it is charged at the third operation is 19 volts, while the next succeeding operation charges the condenser only to 17 volts, with attendant decrease in the length of time necessary to cause the potential of the condenser 149 to reach 5 volts being 1.4 minutes, 1.3 minutes, and 1.2 minutes. It is only necessary to properly correlate the values of the resistance of the compensating resistor 159 and the increase thereof with increase of temperature with the operating characteristics of the toaster structure so that substantially the same degree of toasting is obtained, irrespective of changes of temperature of the toaster structure.

Referring now to Fig. 9 of the drawings, I have there illustrated a slightly different diagram of connections which I may use instead of that shown in Fig. 8 of the drawings. In this diagram I provide a grid controlled rectifier tube, of the negative grid bias type, 181, which has a plate anode 183, a filament 185, which is heated by the voltage drop across a small resistor 109, a cathode 187, a grid 189, and a screen grid 191. In this diagram, further, a timing resistor 193, which has a negative temperature coefficient of resistance, is subject either to heat from the toast heating resistor 39 or is positioned in the toasting chamber. It is connected by conductors 195 and 197 to conductors 123 and 145. The capacitance of condenser 149 is on the order of 10 microfarads, while the cold resistance of timing resistor 193 is on the order of 10 megohms. The resistance of potentiometer 127 is on the order of 20 ohms, while the resistance of a current limiting resistor 151 connected to the grid 189 is 200 ohms.

Substantially the same steps occur during the downward movement of the bread carriers and therefore of the roller 143 preparatory to starting a toasting operation. Contact arms 137 and 139 will be caused to engage, as will also contact arms 153 and 155, of which arm 153 is connected by a conductor 199 with conductor 107, while arm 155 is connected by a conductor 161 to one terminal of the potentiometer 127, the other terminal of which is connected to the conductor 123.

Let it be assumed that the position of contact arm 129, shown in Fig. 9, will cause charging of condenser 149 to a potential on the order of say 40 volts and that it will require the discharge of condenser 149 to a potential on the order of —5 volts in order to fire the tube 181. The correlation of the resistances of the potentiometer and of the timing resistor 193 with the tube 181 will cause the condenser to discharge to approximately −5 volts in from two to three minutes, whereupon the tube 181 is fired or becomes conducting, the current flow therethrough being at each positive half-wave through the circuit mentioned hereinbefore in connection with Fig. 3 of the drawings. This will cause termination of the toasting operation with quick upward movement of the bread carriers ready for removal of the toasted slices of bread.

If it be desired to obtain a lighter degree of toasting, it is only necessary to turn the contact arm 129 in a counter-clockwise direction; while if it is desired to obtain a darker piece of toast, it is only necessary to turn the contact arm 129 in a clockwise direction.

The timing resistor 193 having a negative temperature coefficient of resistance and being subject either to heat from the toast heating elements or being positioned in the toasting chamber, the resistance thereof will decrease so that the voltage to which tube 181 is charged during the engagement of contact arms 153 and 155 will be decreased in the proper proportion so that as the temperature of the toaster increases, the time or duration of a toasting operation will decrease to cause the degree of toasting effected during a toasting operation to remain substantially the same, irrespective of temperature increase of the toaster assembly.

Referring now to Fig. 10 of the drawings, I have there illustrated a still further modification of a diagram of connections embodying my invention in which a mercury-vapor, three-electrode tube 201 is so positioned in the toaster structure as to receive heat from the toast heating elements 39 or to be subject to heat from the toasting chamber. The tube 201 includes a plate anode 203, a filament 205, a grid 207, as well as a cathode 209. The mercury vapor tube 201 operates with a negative bias on the control grid, the higher the temperature of the mercury vapor within the tube, the more negative is the critical grid breakdown voltage of the tube.

Reference to Fig. 14 shows the breakdown grid bias voltage for different temperatures of the mercury vapor. It will be seen that when the temperature of the mercury vapor is about 35° C., it will fire or become conducting at a grid voltage of −5 volts; when the temperature is 50° C., it will fire at a grid voltage of −9 volts; when the temperature is 70° C., it will fire at a grid voltage of −11 volts and will fire at −12 volts when the temperature is 80° C.

The discharge characteristic of condenser 149 when charged to 40 volts is shown by curve 211 in Fig. 13, from which it will be noted that it will require on the order of two minutes for the condenser to discharge from 40 volts to 5 volts. It will require 1.4 minutes for the condenser to discharge to 9 volts, 1.3 minutes to discharge to 11 volts and 1.2 minutes to discharge to 12 volts. These specific or particular values may not be correct and applicable to all conditions, but it is only necessary to properly correlate the characteristics of tube 201 with the characteristics as to the resistance of timing resistor 147 with the resistor of potentiometer 127 and the capacitance of condenser 149, so that the result will be substantially uniform toasting of successive slices of bread, irrespective of changes of temperature of the toaster and therefore of the tube 201.

If it is desired to vary the degree of toasting of a toasted slice of bread, it is only necessary to move contact arm 129 in a counter-clockwise direction to obtain a lesser degree of toasting or to move it in a clockwise direction to obtain a greater degree of toasting, it being understood that the duration of the toasting operation is varied at the same time to obtain the desired difference in the degree of toasting.

It is therefore evident that either one of the three diagrams of connections shown will cause initial charging of a timing condenser during the time of moving downward the bread carriers by means of two pairs of contact arms, which are closed or caused to move into engagement with each other during a portion of the time of downward movement, while these contact arms or switches are out of engagement with each other or in open position during a toasting operation, as well as after the bread carriers have been moved back into their upper non-toasting position. During a toasting operation the initially fully charged timing condenser is effective on the timing resistor to cause decrease of its charge and therefore of the potential between terminals of the timing condenser until this potential reaches a value when it will fire the electron tube connected in shunt therewith, causing quick energization of the electromagnetic latch release means and attendant termination of a toasting operation.

Various modifications may be made in the device embodying my invention without departing from the spirit and scope thereof, and I desire that all obvious modifications thereof covered by the appended claims shall be considered as part of my invention.

I claim as my invention:

1. In an automatic toaster the combination with an electric toast heater and means for starting a toasting operation, of means for terminating a toasting operation, said terminating means comprising a normally non-conducting electron tube, a timing condenser and a timing resistor connected in parallel with each other and with the electron tube, means to charge said condenser before the start of a toating operation to a predetermined high potential, said condenser then discharging through said timing resistor until its potential reaches a predetermined low value at which said tube becomes conducting, the current then traversing said tube causing termination of a toasting operation.

2. In an automatic toaster the combination with electric toast heaters, a control switch for said heaters biased to open position and means movable from a first to a second position to cause closing of said switch to start a toasting operation, of means to terminate a toasting operation comprising an electron tube, a timing condenser connected with said tube, a charging circuit for said condenser, a normally open switch for said condenser, a second normally open switch for said charging circuit and means actuable by said movable means for closing and then opening said two switches during movement of said movable means.

3. In an automatic toaster the combination with electric toast heaters, a control switch for said heaters biased to open position and means movable from an upper to a lower position to cause closing of said switch to start a toasting operation, of means to terminate a toasting operation comprising an electron timing circuit, a source of direct current voltage and means actuable by said movable means for connecting said timing circuit to said voltage source and then disconnecting it from said source during the downward movement of said movable means.

4. In an automatic toaster the combination with electric toast heaters, a control switch for said heaters biased to open position and means movable from an upper to a lower position to cause closing of said switch to start a toasting operation, of means to terminate a toasting operation comprising an electron timing circuit, including an electrostatic condenser, a source of direct current voltage and means actuable by said movable means during its downward movement for connecting said condenser to said source of voltage to fully charge the same and then to disconnect it, while fully charged, from the source of voltage.

5. In an automatic toaster the combination with electric toast heaters adapted to be energized from an electric supply circuit, a control switch for said heaters biased to an upper open position and means movable from an upper to a lower position to cause closing of said switch, of means to terminate a toasting operation comprising a normally non-conducting electron tube, a timing condenser therefor, a charging circuit for said condenser and means actuable by said movable means for connecting said timing condenser to and then disconnecting it from said supply circuit during the downward movement of said movable member before energization of the toast heaters.

6. In an automatic toaster the combination with electric toast heaters, a control switch for said heaters biased to open position and means movable from a first to a second position to cause closing of said switch to start a toasting operation, of means to terminate a toasting operation comprising an electron tube, a timing condenser connected with said tube, a charging circuit for said condenser and means for causing said condenser to be fully charged and to begin to discharge before energization of the toast heaters.

7. In an automatic toaster the combination with electric toast heaters, a control switch for said heaters biased to open position and means movable from an upper to a lower position to cause closing of said switch and start of a toasting operation, of means to terminate a toasting operation comprising a normally non-conducting electron tube having a grid and adapted to become conducting at a predetermined negative grid bias and means for impressing a higher negative grid bias on the grid of said tube than said predetermined bias before closing of said heater control switch.

8. In an automatic toaster the combination with an electric toast heater, a control switch for said heater biased to open position and movable means for causing closing of said switch to start a toasting operation, of means to terminate a toasting operation, comprising a normally non-conducting electron tube adapted to become conducting at a relatively low grid bias, a timing condenser, a charging circuit for said condenser including a potentiometer resistor, and a rectifier, a first switch for said condenser biased to open position, a second switch for said energizing circuit biased to open position, means actuable by said movable means for closing and then opening said first and second switch during downward movement of said movable means, a timing resistor connected in parallel circuit with said timing condenser, said timing resistor having a nega- tive temperature coefficient of resistance and being subject to heat from the toast heater to cause substantially uniform degree of toasting of successive slices of bread, irrespective of change of the temperature of the toaster.

9. In an automatic toaster the combination with an electric toast heater, a control switch for said heater biased to open position and movable means for causing closing of said switch to start a toasting operation, of means to terminate a toasting operation, comprising a normally non-conducting electron tube adapted to become conducting at a relatively low grid bias, a timing condenser, a charging circuit for said condenser including a potentiometer resistor, and a rectifier, a first switch for said condenser biased to open position, a second switch for said energizing circuit biased to open position, means actuable by said movable means for closing and then opening said first and second switch during downward movement of said movable means, a timing resistor connected in parallel circuit with said timing condenser and a second resistor connected in series circuit with said potentiometer resistor, having a positive temperature coefficient of resistance and being subject to heat from the toast heater to cause substantially uniform degree of toasting of successive slices of bread, irrespective of change of temperature of the toaster.

10. In an automatic toaster the combination with an electric toast heater and means for starting a toasting operation, of means for terminating a toasting operation, said terminating means comprising a normally non-conducting electron tube, a timing condenser and a timing resistor connected in parallel with each other and with the electron tube, means to charge said condenser before the start of a toasting operation to a predetermined high potential, said condenser then discharging through said timing resistor until its potential reaches a predetermined low value at which said tube becomes conducting, the current then traversing said tube causing termination of a toasting operation, said timing resistor having a negative temperature coefficient of resistance and being subject to heat from the toast heater to cause substantially uniform toasting of successive slices of bread, irrespective of change of temperature of the toaster.

11. In an automatic toaster the combination with an electric toast heater and means for starting a toasting operation, of means for terminating a toasting operation, said terminating means comprising a normally non-conducting electron tube, a timing condenser and a timing resistor connected in parallel with each other and with the electron tube, means to charge said condenser before the start of a toasting operation to a predetermined high potential, said condenser then discharging through said timing resistor until its potential reaches a predetermined low value at which said tube becomes conducting, the current then traversing said tube causing termination of a toasting operation, said electron tube being subject to heat from the toast heater to become conducting at a higher voltage to cause substantially uniform toasting of successive slices of bread, irrespective of increase of temperature of said toaster.

12. In an automatic toaster the combination with a toasting chamber, electric toast heaters in said chamber adapted to be connected to a supply circuit during a toasting operation, a control switch for said toast heaters biased to open position and movable means for causing closing of said switch to start a toasting operation, of means for terminating a toasting operation, comprising a normally non-conducting electron tube adapted to become conducting at a predetermined relatively low grid bias voltage, a potentiometer resistor connected to said supply circuit, a rectifier energized from said potentiometer resistor, a timing condenser, a timing resistor connected in parallel circuit to said condenser and to said tube, means controlled by said movable means to cause energization of said potentiometer resistor and said rectifier during an appreciable part of the movement of said movable means to charge said condenser to a relatively high electrostatic voltage and to cause the condenser to then discharge through said timing resistor until said tube becomes conducting, means energized by the current traversing said tube to cause opening of said control switch to terminate a toasting operation, and a third resistor connected in series circuit with said potentiometer resistor, having a positive temperature coefficient of resistance and being positioned in said toasting chamber to cause substantially uniform toasting of successive slices of bread, irrespective of increase of toaster temperature.

13. In an automatic toaster the combination with a toasting chamber, electric toast heaters in said chamber adapted to be connected to a supply circuit during a toasting operation, a control switch for said toast heaters biased to open position and movable means for causing closing of said switch to start a toasting operation, of means for terminating a toasting operation, comprising a normally non-conducting electron tube adapted to become conducting at a predetermined relatively low grid bias voltage, a potentiometer resistor connected to said supply circuit, a rectifier energized from said potentiometer resistor, a timing condenser, a timing resistor connected in parallel circuit to said condenser and to said tube, means controlled by said movable means to cause energization of said potentiometer resistor and said rectifier during an appreciable part of the movement of said movable means to charge said condenser to a relatively high electrostatic voltage and to cause the condenser to then discharge through said timing resistor until said tube becomes conducting, means energized by the current traversing said tube to cause opening of said control switch to terminate a toasting operation, said timing resistor having a negative temperature coefficient of resistance and being positioned in the toasting chamber to cause substantially uniform toasting of successive slices of bread, irrespective of increase of temperature of the toaster.

14. In an automatic toaster the combination with a toasting chamber, electric toast heaters in said chamber adapted to be connected to a supply circuit during a toasting operation, a control switch for said toast heaters biased to open position and movable means for causing closing of said switch to start a toasting operation, of means for terminating a toasting operation, comprising a normally non-conducting electron tube adapted to become conducting at a predetermined relatively low grid bias voltage, a potentiometer resistor connected to said supply circuit, a rectifier energized from said potentiometer resistor, a timing condenser, a timing resistor connected in parallel circuit to said condenser and to said tube, means controlled by said movable means to cause energization of said potentiometer resistor and said rectifier during an appreciable part of the movement of said movable means to charge said condenser to a relatively high electrostatic voltage and to cause the condenser to then discharge through said timing resistor until said tube becomes conducting, means energized by the current traversing said tube to cause opening of said control switch to terminate a toasting operation, said tube becoming conducting at higher negative grid bias voltages upon increase of temperature thereof and being subject to heat from the toasting chamber to cause substantially uniform toasting of successive slices of bread, irrespective of increase of temperature of the toaster.

15. In an automatic toaster the combination with electric toast heaters, a control switch for said heaters biased to open position and means movable from a first to a second position to cause closing of said switch to start a toasting operation, of means to terminate a toasting operation comprising an electron tube, a timing condenser connected with said tube, a charging circuit for said condenser, a normally open switch for said condenser, a second normally open switch for said charging circuit and means actuable by said movable means for closing and then opening said two switches during movement of said movable means, a timing resistor through which said condenser may discharge, said timing resistor having a negative temperature coefficient of resistance and being subject to heat from the toast heater to cause substantially uniform degree of toasting of successive slices of bread, irrespective of change of the temperature of the toaster.

16. In an automatic toaster the combination with electric toast heaters, a control switch for said heaters biased to open position and means movable from a first to a second position to cause closing of said switch to start a toasting operation, of means to terminate a toasting operation comprising an electron tube, a timing condenser connected with said tube, a charging circuit for said condenser, a normally open switch for said condenser, a second normally open switch for said charging circuit and means actuable by said movable means for closing and then opening said two switches during movement of said movable means, a timing resistor connected to said timing condenser for progressively discharging it, and a second resistor connected in series circuit with said potentiometer resistor, having a positive temperature coefficient of resistance and being subject to heat from the toast heater to cause substantially uniform degree of toasting of successive slices of bread, irrespective of change of temperature of the toaster.

17. In an automatic toaster the combination with an electric toast heater and means for starting a toasting operation, of means for terminating a toasting operation, said terminating means comprising a normally non-conducting electron tube, a timing condenser for controlling said tube, a timing resistor connected in circuit with said condenser for progressively discharging it, means to charge said condenser before the start of a toasting operation to a predetermined high potential, said condenser then discharging through said timing resistor until its potential reaches a predetermined low value at which said tube becomes conducting, the current then traversing said tube causing termination of a toasting operation, said timing resistor having a negative temperature coefficient of resistance and being subject to heat from the toast heater to cause substantially uniform toasting of successive slices of bread, irrespective of change of temperature of the toaster.

18. In an automatic toaster the combination with an electric toast heater and means for starting a toasting operation, of means for terminating a toasting operation, said terminating means comprising a normally non-conducting electron tube, a timing condenser for controlling said tube, a timing resistor connected in circuit with said condenser for progressively discharging it, means to charge said condenser before the start of a toasting operation to a predetermined high potential, said condenser then discharging through said timing resistor until its potential reaches a predetermined low value at which said tube becomes conducting, the current then traversing said tube causing termination of a toasting operation, said electron tube being subject to heat from the toast heater to become conducting at a higher voltage to cause substantially uniform toasting of successive slices of bread, irrespective of increase of temperature of said toaster.

BROR G. OLVING.

REFERENCES CITED

The following references are of record in the file of this patent:

UNITED STATES PATENTS

| Number | Name | Date |
|---|---|---|
| 2,061,011 | Vingerhoets | Nov. 17, 1936 |
| 2,207,946 | Sardeson | July 16, 1940 |
| 2,317,228 | Shroyer | Apr. 20, 1943 |
| 2,363,998 | Palmer et al. | Dec. 12, 1944 |